United States Patent
Menezes et al.

(10) Patent No.: US 8,547,246 B2
(45) Date of Patent: Oct. 1, 2013

(54) TELEMETRY SYSTEM FOR SLICKLINE ENABLING REAL TIME LOGGING

(75) Inventors: Clive D. Menezes, Conroe, TX (US); Billy C. Bankston, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 588 days.

(21) Appl. No.: 12/680,079

(22) PCT Filed: Oct. 9, 2007

(86) PCT No.: PCT/US2007/080791
§ 371 (c)(1),
(2), (4) Date: Mar. 25, 2010

(87) PCT Pub. No.: WO2009/048459
PCT Pub. Date: Apr. 16, 2009

(65) Prior Publication Data
US 2010/0194588 A1   Aug. 5, 2010

(51) Int. Cl.
*G01V 3/00* (2006.01)
(52) U.S. Cl.
USPC .................... 340/854.9; 340/854.3
(58) Field of Classification Search
USPC ...................... 340/854.9, 854.3, 853.1, 854.5
See application file for complete search history.

(56) References Cited

U.S. PATENT DOCUMENTS

| 4,012,712 | A | | 3/1977 | Nelligan |
|---|---|---|---|---|
| 4,505,155 | A | * | 3/1985 | Jackson ..................... 73/152.51 |
| RE32,070 | E | | 1/1986 | Vezin |
| 5,894,104 | A | * | 4/1999 | Hedberg ........................ 174/36 |
| 6,188,223 | B1 | | 2/2001 | Van Steenwyk et al. |
| 6,711,947 | B2 | * | 3/2004 | Maute ......................... 73/152.29 |
| 6,792,866 | B2 | * | 9/2004 | Grattan .......................... 102/310 |
| 7,140,435 | B2 | | 11/2006 | Defretin et al. |
| 7,224,289 | B2 | * | 5/2007 | Bausov et al. ............. 340/854.8 |
| 7,389,183 | B2 | * | 6/2008 | Gray ................................ 702/6 |
| 7,439,494 | B2 | | 10/2008 | Gilchrist et al. |
| 7,652,592 | B2 | | 1/2010 | Le Briere et al. |
| 2005/0121606 | A1 | | 6/2005 | Gilchrist et al. |
| 2006/0260739 | A1 | * | 11/2006 | Varkey ..................... 156/244.12 |
| 2007/0158071 | A1 | * | 7/2007 | Mooney et al. ............... 166/298 |

FOREIGN PATENT DOCUMENTS

| WO | WO-2004/063528 | 7/2004 |
|---|---|---|
| WO | 2006059157 A | 6/2006 |

OTHER PUBLICATIONS

Canadian Intellectual Property Office, Examiner's Letter in Application No. 2,701,177 (the Canadian application that corresponds to the instant US application), Feb. 8, 2012.

Examination Report by the Austrian Patent Office on GCC/P/2008/11899, which is the GCC application that corresponds to the instant application; note that while the examination report indicates that it was mailed on Jul. 18, 2011, the GCC Patent Office did not issue the examination report until Apr. 24, 2012.

\* cited by examiner

*Primary Examiner* — Peguy Jean Pierre

(74) *Attorney, Agent, or Firm* — Howard L. Speight; Bradley Misley

(57) ABSTRACT

A system for communicating with a slickline tool is disclosed. The system includes a closed-loop electrical circuit including a surface module, a forward path, a tool, and a return path. The forward path includes a slickline cable.

20 Claims, 3 Drawing Sheets

TELEMETRY SYSTEM FOR SLICKLINE ENABLING REAL TIME LOGGING

BACKGROUND

Conventional slickline logging systems employ battery-powered instruments that record logging information for later retrieval once the tool returns to the surface. Logging parameters are programmed at the surface, the tool is run into the bore hole where measurements are made according to the programmed logging parameters, and the tool is returned to the surface. The results of the logging session are evaluated and, if they are determined to be inadequate, the logging parameters are changed and another logging session is run.

Conventional wireline logging uses wireline cables that have a much larger diameter (on the to order of an inch or more) as compared with slickline cables (an eighth of an inch or less). This difference in diameter prevents wireline cables from being used in high-pressure wells.

DETAILED DESCRIPTION

Figure 1:
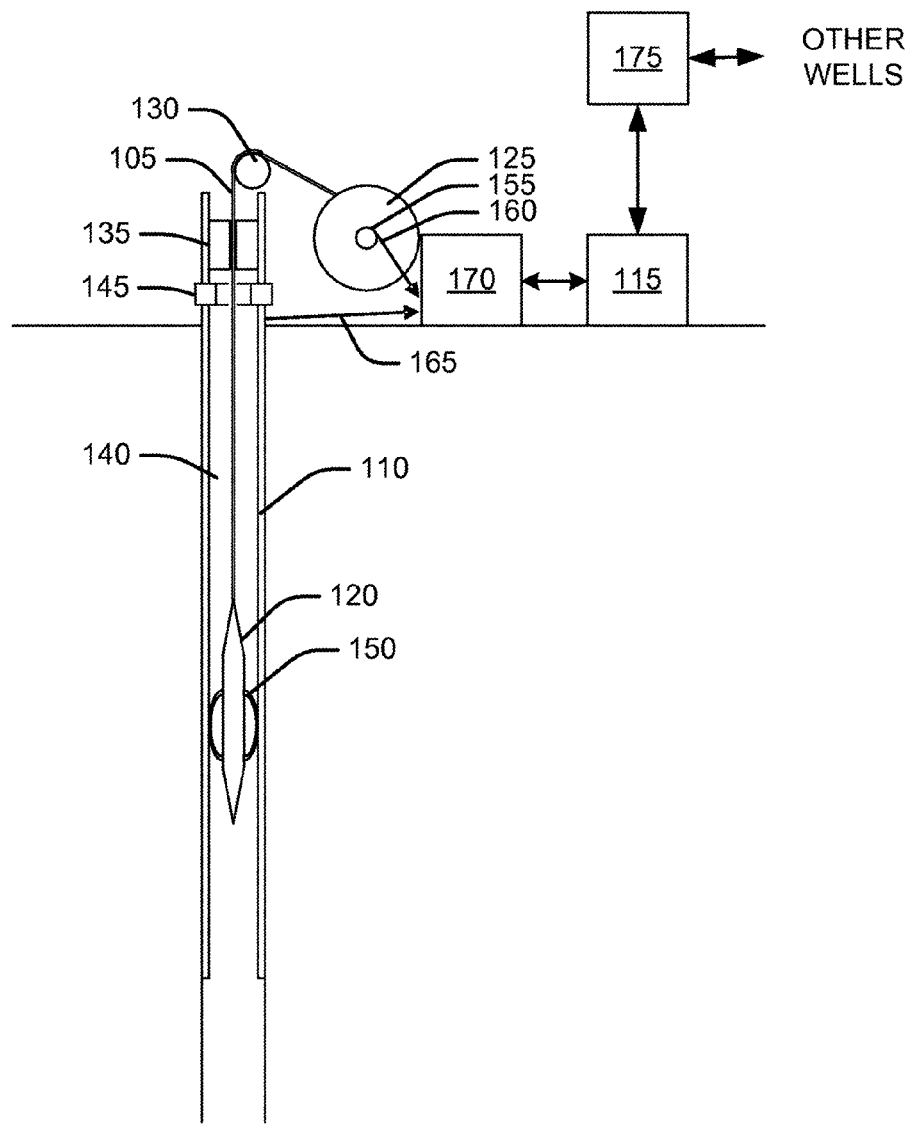
FIG. 1 illustrates a slickline system.

In some embodiments of a telemetry system for slickline enabling real time logging, such as that illustrated in FIG. 1, an insulated slickline cable 105 and a well casing 110 provide an electrical connection between a surface electronics module 115 and a tool 120, forming a complete electrical circuit. In some embodiments, the tool 120 is a logging tool. The insulated slickline cable 105 provides a forward path for signals from the tool 120 to the surface electronics module 115, or vice versa. The well casing 110, which in some embodiments is made of a conductive material such as steel, provides a return path for the signals. In some embodiments, the well casing 110 provides the forward path for the signals and the slickline cable 105 provides the return path. In some embodiments, the well casing 110 does not extend the full length of the bore hole 140.

In some embodiments, the slickline cable 105 is stored on a draw works or spool 125 and proceeds through a pulley or system of pulleys 130 and through a packing assembly 135. The packing assembly 135 provides a seal between the high pressures in the bore hole 140 and the ambient pressure at the surface. In some embodiments, the slickline cable 105 proceeds through a blow-out preventer 145 that enables personnel to seal the well if, for example, the packing to assembly 135 fails. In some embodiments, the blow-out preventer 145 is a valve that is normally open when the slickline system is in operation but is automatically or manually closed in the event of a blow out. It will be understood that the system may include other elements that are used in slickline logging systems.

In some embodiments, the slickline cable 105 is electrically and mechanically coupled to the tool 120. While in most slickline systems the coupling between the slickline cable 105 and the tool 120 is a sturdy mechanical connection, capable of sustaining the connection through the entire slickline operation, in most slickline systems efforts are made to insure that there is no electrical connection between the slickline cable 105 and the tool 120. In the embodiment illustrated in FIG. 1, however, it is intended that the slickline cable 105 be electrically connected to the tool 120. The electrical and mechanical connection between the slickline cable 105 and the tool 120 is a conventional connection between a cable and a relatively heavy load.

In some embodiments, the tool 120 includes sensors and actuators, such as probes, pressure sensors, acoustic sensors, and other similar sensors and actuators. In addition, the tool 120 may have stabilizers 150 that are fixedly deployed or that deploy when the tool 120 is making certain measurements. In some embodiments, the tool's sensors, probes, and/or stabilizers have dual roles. In addition to their normal functions, they provide an electrical connection between the tool 120 and the well casing 110 when making contact with the well casing 110. In some embodiments, the tool has a special member (not shown) that is dedicated to providing the electrical connection between the tool 120 and the well casing 110 and has no other function. In some embodiments, the tool has a special member (not shown) that provides an electrical connection to the well casing 110 and extends to maintain that electrical connection when the tool 120 drops in the bore hole 140 below the lowest level of well casing 110. For example, such a member may be a cable on a reel in the tool 120. The cable may have a magnetic conductor that attaches to the well casing and the reel may extend and retract the cable as the tool 120 is lowered and raised. In some embodiments, the wall of the bore hole 140 below the well casing 110 is sufficiently conductive to form part of the return path and the connection from the tool 120 to the wall of the bore hole 140 is made through the means described above.

In some embodiments, the tool 120 is capable of operating in two modes: (a) a first mode in which the forward path and return path are present allowing communication between the tool 120 and the surface equipment module 115, and (b) a second mode in which such communications are not possible or desired. For example, the tool 120 may operate in the first mode in the bore hole to 140 above the lowest level of well casing 110 and then transition to the second mode if it is lowered below the lowest level of well casing 110. In that example, the tool 120 could (a) be programmed with logging parameters when it is located such that it can operate in the first mode, (b) be lowered until it must operate in the second mode, logging and storing data, and (c) be raised until it can operate in the first mode at which time some or all of the logged data, or data based on some or all of the logged data, can be uploaded from the tool 120 to the surface equipment module 115 and new logging parameters can be downloaded.

In some embodiments, the electrical connection between the tool 120 and the well casing 110 is intended to be continuous or at least partially continuous, such as, for example, when the electrical connection is made through a permanently deployed stabilizer. In some embodiments, the electrical connection between the tool 120 and the well casing occurs only, for example, when a sensor is deployed to make a measurement and the sensor makes contact with the well casing 110.

In some embodiments, the electrical connection between the tool 120 and the well casing 110 is direct, such as, for example, when the electrical connection is made by pressing a sensor against the well casing 110. In some embodiments, the electrical connection is indirect. For example, the electrical connection may be capacitive. In such embodiments, a varying potential difference between the slickline cable 105 and the well casing 110 may be used to represent data being transmitted to or from the tool 120. In some embodiments, the slickline cable 105 and/or the well casing 110 may act as a transmission line.

In some embodiments, the surface electronics module 115 is directly connected to the slickline cable 105. For example, in some embodiments the slickline cable 105 has an electrical connection to a contact 155 on the draw works or spool 125. The surface electronics module 115 has an electrical connection to the contact 155 through, for example, a brush 160 that presses against the contact 155 even while the draw works or spool 125 is rotating. The brush 160 and contact 155 allow the surface electronics module 115 to connect to the slickline cable 105 providing a forward path to the tool 120. In some embodiments, the surface electronics module 115 has an electrical connection 165 to the well casing 110, which provides a return path for the electrical connection made through the forward path through the slickline cable 105.

In some embodiments, a safety module 170 is provided. The purpose of the safety module 170 is to control the amount of power flowing through the slickline cable 105 such that, should a short circuit occur between, for example, the slickline cable 105 and the well casing 110, the power flowing though the slickline cable will not be sufficient to ignite or explode the gasses in the bore hole 140. The selection of the components in the safety module is conventional and is based on a number of factors, including the identity, pressure, and temperature of the gas in the bore hole, standard ignition gas curves, the depth that the tool is expected to penetrate in the well bore, and other similar parameters that are known to practitioners of safety module art. In some embodiments, for example, the safety module 170 includes a zener barrier and a current limiting resistor. Alternative safety techniques may also be utilized in addition to, or as an alternative to, the above described technique.

Figure 2:
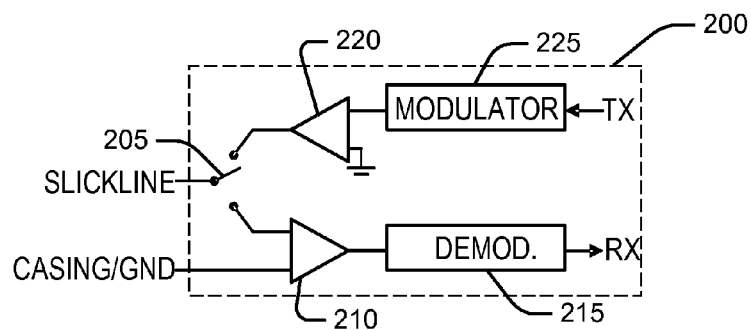
FIG. 2 illustrates a communication module.

In some embodiments, the tool 120 and/or the surface electronics module 115 include a communications module 200, such as that illustrated in FIG. 2. In some embodiments, the slickline cable 105 is connected to a single-pole, double-throw switch 205. It will be understood that switch 205 is not necessarily a mechanical switch such as that suggested by FIG. 2. It may be an electronic switch, employing electronics to make and break the connections. Other switching techniques are possible.

In some embodiments, the switch 205 connects the slickline cable 105 to the input of a differential amplifier 210 when it is in one position. In some embodiments, the other input to differential amplifier 210 is connected to the well casing 110. The differential amplifier rejects the noise that is common to the forward path (the slickline cable 205) and the return path (the well casing 110), and produces a modulated signal with reduced common-mode noise at its output. In some embodiments that signal is provided to a demodulator 215, which demodulates the received signal and produces a digital signal that is provided to the other equipment in the tool 120 or surface electronics module 115, depending on where the communications module is located.

In some embodiments, when the switch 205 is in the second position (i.e., the position shown in FIG. 2), it connects the slickline cable 105 to the output of an amplifier 220, which amplifies the modulated output of a modulator 225 and conditions the signal for transmission over the slickline cable 105 with the return path (e.g., the well casing 110) providing an electrical reference for the transmitted signal. In some embodiments, the modulator receives input data that is to be transmitted from other equipment in the tool 120 or surface electronics module 115, depending on where the communications module is located.

Figure 3:
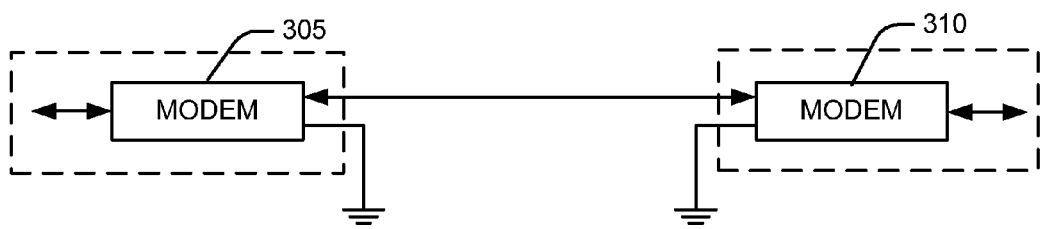
FIG. 3 illustrates a modem connection between a surface module and a slickline tool via a slickline cable.

In some embodiments, as shown in FIG. 3, the tool 120 and the surface electronics module 115 each contain a modem, 305 and 310 respectively. In some embodiments, the modems allow to half duplex or full duplex signaling between the tool 120 and the surface electronics module 115 using standard modem communication techniques.

In some embodiments, the resistance of the slickline cable 105 is too high for supplying electrical power to the tool 120 and the tool 120 is powered by batteries. In some embodiments, the tool 120 is equipped with a battery charging device, such as a turbine driven by fluids flowing in the bore hole. If, however, conditions are such that power can be supplied from the surface through the slickline cable 105, in some embodiments the power will be supplied as direct current or as alternating current and signals between the tool 120 and the surface electronics module 115 will be modulated onto a carrier that operates at a suitable frequency such that the power and signals will not interfere with each other. In either case, the data rate depends strongly on the electrical characteristics of the slickline cable 105, but in some embodiments will be initially set to be at least 600 bits per second. In some embodiments, performance, e.g., bit error rate, will be monitored at the tool 120 and at the surface electronics module 115 and the data rate will be adjusted as necessary. For example, if it is determined that the bit error rate of transmissions between the tool 120 and the surface electronics module 115 are too high, the transmission rate may be reduced. Alternatively, the transmission may be switched to a different modulation technique. Other transmission variables may be altered to attempt to improve the bit error rate.

The data that is transferred between the tool 120 and the surface electronics module 115 can be of almost any type. For example, in some embodiments, the tool 120 transmits logging data as it is collected. The data can be checked at the surface and new logging parameters can be transmitted from the surface electronic module 115 to the tool 120, without having to retrieve the tool 120 to the surface. In one embodiment the surface electronics module 115 is coupled to a remote real time operating center 175 so that data received from other remote wells may be used in making logging decisions for the well being logged. In one embodiment, the surface electronics module 115 transmits data to the remote real time operating center 175. The transmitted data may be the data received from the tool 120 or it may be data derived from data received from the tool 120. In one embodiment, the remote real time operating center 175 uses the transmitted data, and, optionally, data from other remote wells, to formulate new logging parameters for the tool 120. In one embodiment, the remote real time operating center 175 transmits the new logging parameters to the surface electronics module 115, which transmits the new logging parameters to the tool 120. The new logging parameters transmitted to the tool 120 may be the same logging parameters transmitted from the remote real time operating center 175 to the surface electronics module 115 or they may be derived from those logging parameters.

Slickline cable is readily available from many manufacturers. Manufacturers can insulate the cable as specified. While a thin oxide coating may be sufficient, a polymer or Teflon coating may perform better under adverse conditions involving corrosive chemicals at elevated temperatures and pressures.

Figure 4:
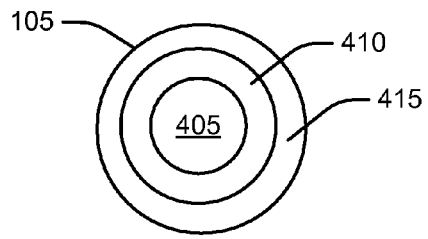
FIG. 4 illustrates a slickline cable with multiple coatings.
Figure 5:
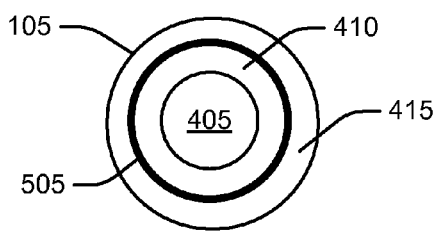
FIG. 5 illustrates a slickline cable with multiple coatings and a conductive shield.

In some embodiments, as shown in FIG. 4, the slickline cable 105 consists of a solid wire core 405, an inner coating or jacket 410 and an outer coating or jacket 415. In some embodiments, the outer coating 415 is resistant to abrasions and smooth, to allow easy travel through the packing assembly 135 and blow-out preventer 145. In some embodiments, the inner coating 410 is heat resistant. In some embodiments, one or both of the coatings are good insulators.

In some embodiments, the outer coating 415 is an epoxy and the inner coating 410 is a polyolephine. In some embodiments, the outer coating 415 is similar to the coating that is typically used on transformer windings, with enhanced heat resistance and smoothness.

In some embodiments, the slickline cable 105 includes a conductive shield 505 between the inner coating 410 and the other coating 415. In some embodiments, the conductive shield 505 acts as the return path.

Figure 6:
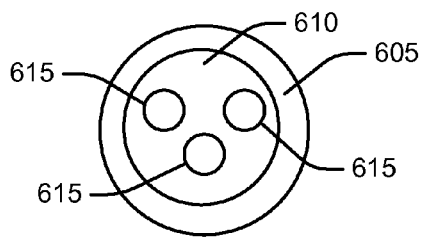
FIG. 6 illustrates a slickline cable including a hard jacketed cable.

In some embodiments, the slickline cable 105 includes a hard jacketed cable, as illustrated in FIG. 6. In some embodiments, the hard jacketed cable includes three parts:
  (1) an outer tube 605 made of steel; in some embodiments the outer tube includes a stainless steel, similar to the stainless steels used in a standard slickline cable; the type of steel, i.e., the strength, corrosion resistance, etc., is selected according to the environment that the cable is expected to experience; the thickness of the outer tube 605 is selected (a) to provide the strength necessary to pull and hold the tool 120 and the cable itself over the entire distance and depth the tool 120 is expected to operate in the bore hole 140 and/or (b) to be flexible enough to maneuver through the bore hole 140, or at least that portion of the bore hole to be surveyed by the slickline tool;
  (2) an insulating layer 610; in some embodiments the insulating layer 610 is a high temperature insulator that has the property of helping to maintain the form of the outer tube 605; in some embodiments the insulating layer 610 comprises magnesium oxide; and
  (3) one or more conductors 615; in some embodiments the conductor is copper wire; in some embodiments the conductor is a solid wire; in some embodiments the conductor is a stranded wire.

In some embodiments, the outer tube 605 acts as the return path and one or more of the conductors 615 acts as the forward path. In some embodiments, the one or more of the conductors 615 acts as the forward path and one or more of the conductors 615 acts as the return path. In some embodiments, the conductors 615 are used to provide power to the tool 120.

Figure 7:
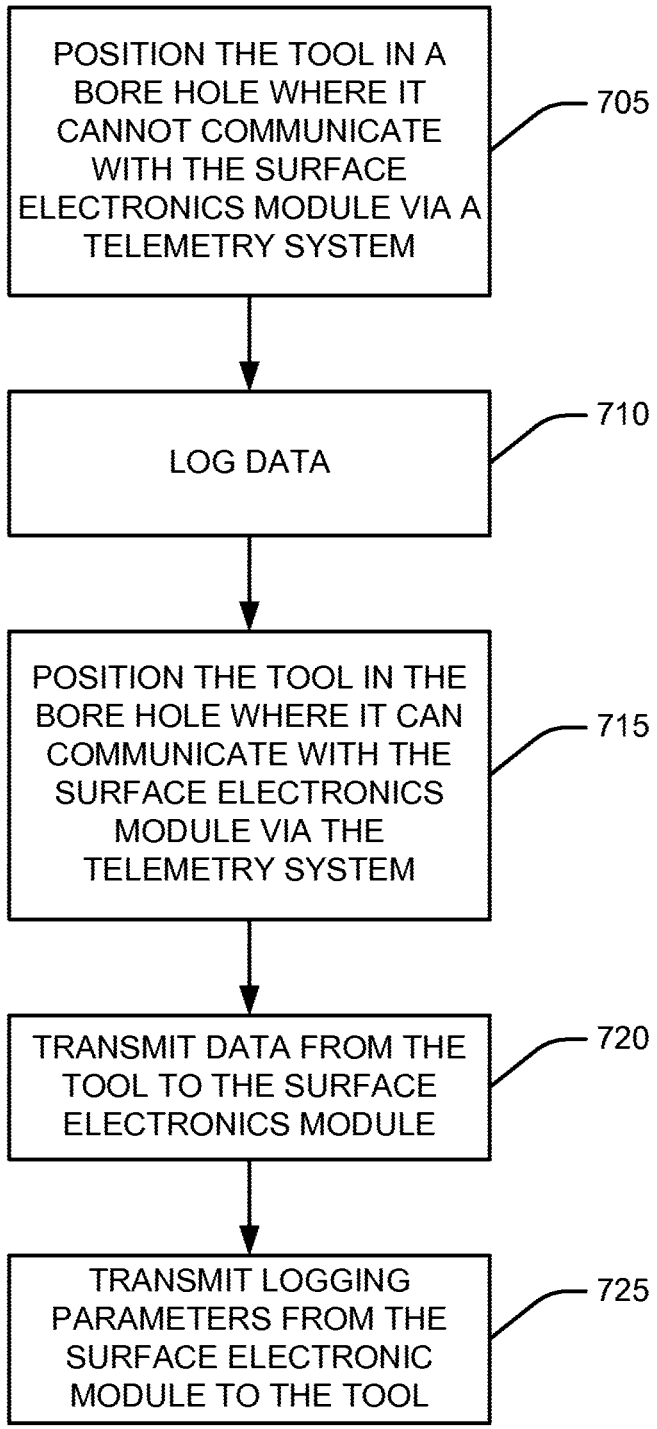
FIG. 7 illustrates a method for using a telemetry system for slickline enabling real time logging.

A method for slickline logging, illustrated in FIG. 7, begins by positioning the tool in a bore hole where it cannot communicate with the surface electronics module via the telemetry system (block 705). The tool then logs data (block 710). The tool is then positioned in the bore hole such that it can communicate with the surface electronics module via the telemetry system (block 715). The tool then transmits data based on some or all of the logged data to the surface electronics module (block 720). Then, if it a new logging session is desired or necessary, the surface electronics module transmits logging parameters to the slickline tool (block 730).

The proposed system makes possible the use of real time logging with slickline, something that has not been previously available. Wireline logging employs armored cables that are simply too large and too rough to function in slickline environments.

The text above describes one or more specific embodiments of a broader invention. The invention also is carried out in a variety of alternate embodiments and thus is not limited to those described here. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

The invention claimed is:

1. A system for communicating with a tool, comprising:
  a closed-loop electrical circuit including:
    a surface module located on a surface of the earth;
    a tool located in a well borehole;
    a forward path between the surface module and the tool, the forward path comprising an insulated slickline cable, the slickline cable being mechanically coupled to the tool and to a device on the surface, the slickline cable being electrically coupled to the tool; and
    a return path between the surface module and the tool; and
  a safety module coupled to the forward path to prevent the power flowing in the forward path from reaching a level where it might cause a predetermined gas at a predetermined pressure and temperature to explode.

2. The system of claim 1 wherein:
the return path comprises a well casing.

3. The system of claim 1 wherein:
the tool is any one of directly coupled to the return path and indirectly coupled to the return path.

4. The system of claim 1 wherein:
the return path comprises a well casing;
the tool comprises a member that makes electrical contact with the well casing.

5. The system of claim 4 wherein the member is selected from one of: a sensor, a stabilizer, a probe.

6. The system of claim 1 wherein:
the tool comprises a modem; and
the surface module comprises a modem to communicate with the tool modem by way of the forward path and the return path.

7. The system of claim 1 wherein:
the insulated slickline cable is coated with an outer coating and an inner coating, one of the coatings being abrasion-resistant and the other coating being heat-resistant.

8. An insulated slickline cable, comprising:
  a conductive solid wire;
  a first insulating coating applied to the wire;
  a second insulating coating applied to the wire on top of the first insulating coating; and
  a coupling attached to one end of the wire, the coupling allowing a mechanical connection to a tool and an electrical connection to the tool.

9. The insulated slickline cable of claim 8 wherein one of the coatings is heat-resistant and one of the coatings is abrasion-resistant.

10. The insulated slickline cable of claim 8 wherein the first coating comprises polyolephine and the second coating comprises an epoxy.

11. The insulated slickline cable of claim 8 further comprising a conductive metal shield between the first insulating coating and the second insulating coating.

12. A slickline tool comprising:
  a forward path coupling allowing a mechanical and an electrical connection to a slickline cable, the slickline cable providing a forward path for a communication signal;
  a return path coupling allowing an electrical connection to a return path for the communication signal; and a communication interface comprising a receiver coupleable to the forward path to receive data and a transmitter coupleable to the forward path to transmit data;

wherein the return path coupling is capable of making one of a direct electrical connection to the return path and an indirect electrical connection to the return path.

13. The slickline tool of claim 12 wherein the return path coupling is capable of making a capacitive connection to the return path.

14. The slickline tool of claim 12 wherein:

the coupling to the return path comprises an electrically-conductive member that selectively extends from the tool.

15. The slickline tool of claim 12 wherein the return path coupling is extendable.

16. The slickline tool of claim 12 comprising a mode of operation in which one or more of the forward path and the return path are not always available.

17. A method for slickline logging, comprising:

positioning a slickline tool in a bore hole where it cannot communicate with a surface electronics module via a telemetry system;

logging data;

positioning the slickline tool in the bore hole where it can communicate with the surface electronics module via the telemetry system; and transmitting data based on some or all of the logged data from the slickline tool to the surface electronics module.

18. The method of claim 17 further comprising:

transmitting logging parameters from the surface electronics module to the slickline tool.

19. The method of claim 17 further comprising:

transmitting data based on the data received from the slickline tool from the surface electronics module to a real time operations center;

using the transmitted data at the real time operations center along with data from other wells to generate logging parameters;

transmitting the logging parameters from the real time operations center to the surface electronics module; and transmitting commands based on the logging parameters from the surface electronics module to the slickline tool.

20. The method of claim 17 further comprising:

using the flow of fluids in the bore hole to charge a battery in the slickline tool.

* * * * *